Feb. 21, 1928.　1,659,715
G. R. BAKER ET AL
APPARATUS FOR CUTTING DOUGH AND LIKE PLASTIC SUBSTANCES
Filed Dec. 24, 1925　2 Sheets-Sheet 1
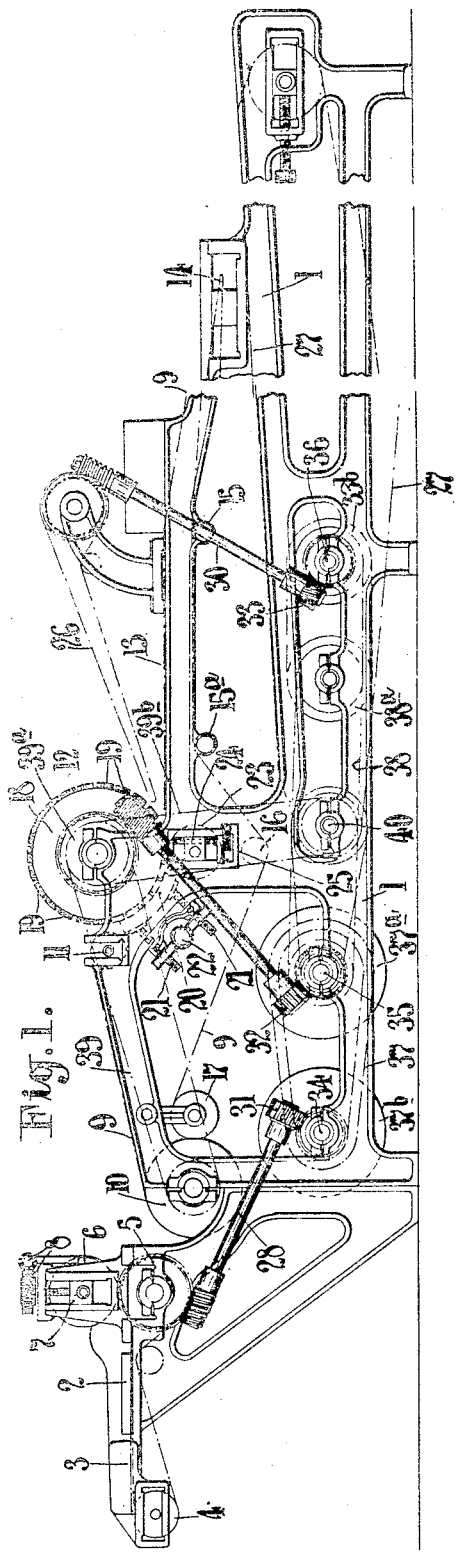
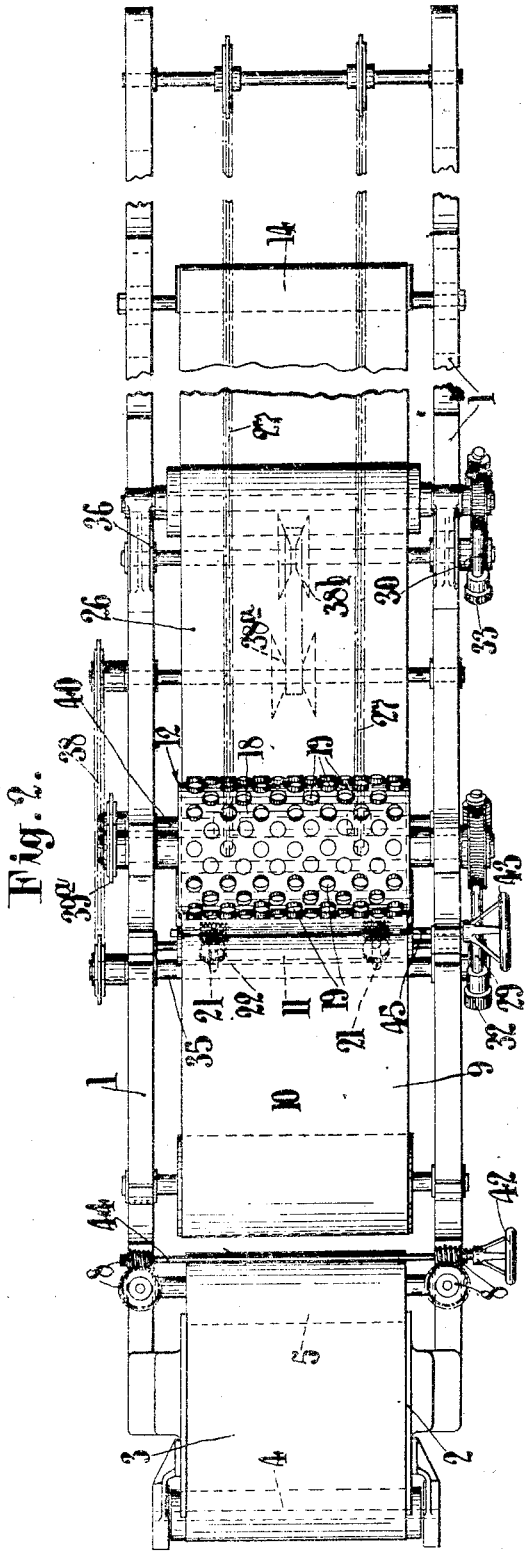
Inventors:
George Ralph Baker,
William Edward Prescott.

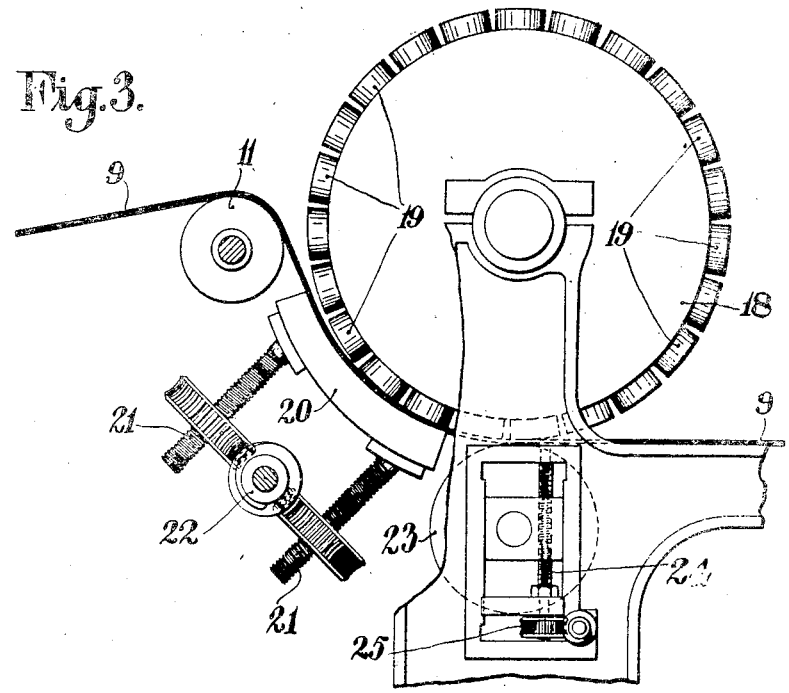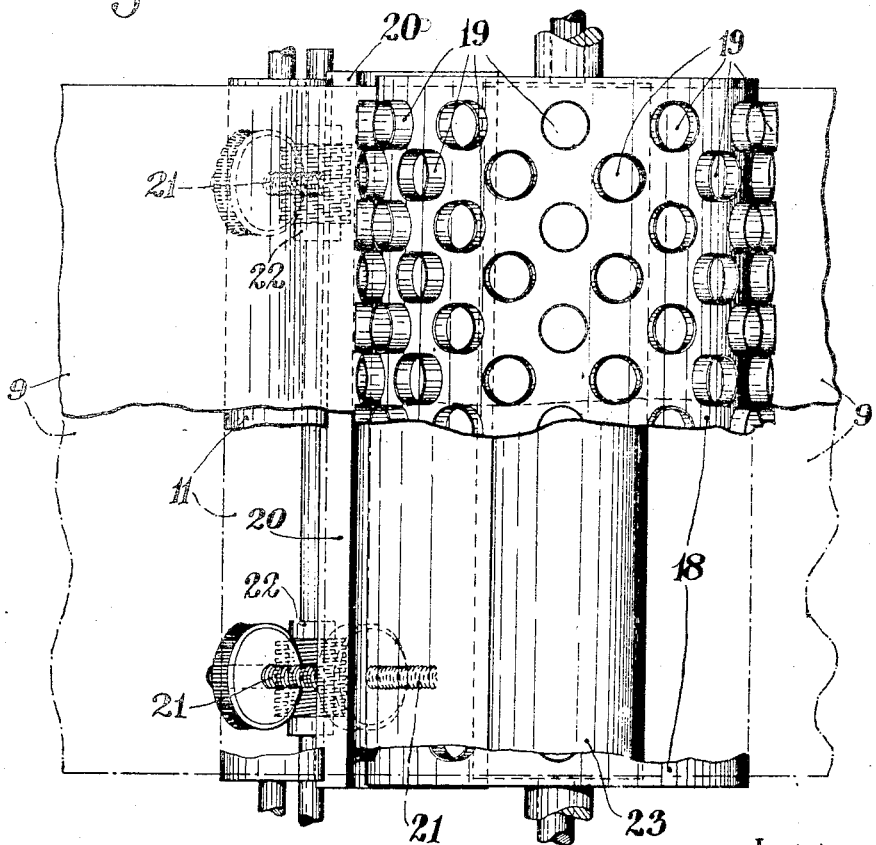

Patented Feb. 21, 1928.

1,659,715

UNITED STATES PATENT OFFICE.

GEORGE RALPH BAKER AND WILLIAM EDWARD PRESCOTT, OF LONDON, ENGLAND, ASSIGNORS TO BAKER PERKINS COMPANY INCORPORATED, OF NEW YORK, N. Y., A CORPORATION OF NEW YORK.

APPARATUS FOR CUTTING DOUGH AND LIKE PLASTIC SUBSTANCES.

Application filed December 24, 1925, Serial No. 77,508, and in Great Britain January 1, 1925.

This invention relates to apparatus for cutting dough and like plastic substances more particularly for use in the manufacture of biscuits, and involves the use of a rotary cutting device in the form of a drum, cylinder or the like, having around and projecting from its periphery a series of annular cutters or cutting edges arranged in one or more rows according to the capacity of the device, and a band or web adapted to feed a sheet of dough about part of the periphery of said cutting device. One or more sheeting rollers or pairs thereof may be disposed in advance of the cutting device to determine the thickness of the sheet of dough and put the required finish thereon if this has not already been previously otherwise effected.

The invention comprises in combination with a cutting device and web above referred to, resilient means such as a rubber covered roller cooperating with the web to ensure proper separation of the cut pieces of dough from the scrap. The said resilient means or roller acts to force the web and the cut pieces resiliently into contact with the periphery of the cutting device in the spaces between the cutting edges and subsequently to suck said pieces away thus ensuring the desired separation.

In those forms of apparatus in which a rigid resistance element is used behind the web and against the resistance of which the dough is cut by the cutting device referred to, the invention also comprises a construction in which said resistance element is so shaped or disposed in relation to the cutting device that the dough is caused to gradually approach the cutters to ensure gradual penetration and complete severance of the dough by the cutters. Said resistance element may also be capable of adjustment in relation to the cutting device according to the thickness of the sheet of dough to be cut.

A suitable disposition of the cutting web is to pass same from the sheeting rollers, when provided, or from the commencement of its run, in a horizontal direction and then to curve it around the cutting device for a short distance at the point or points where the cutting is effected, and finally carry it beyond the cutting device in a straight horizontal course, a scrap conveyor being disposed immediately behind the cutting device to remove the scrap, and said scrap conveyor inclining upwards from the web, as in many known forms of biscuit cutting machines.

The cutters may also be provided with positive ejecting devices: for example, movable surfaces, controllable as by spring, cam or other appropriate means, which in addition to serving as ejectors may also act to regulate the thickness of the cut pieces.

An embodiment of the invention is represented in the accompanying drawings in which Fig. 1 is a side elevation and Fig. 2 a plan view of the complete machine, with certain parts of the framing broken away; and Figs. 3 and 4 are, respectively, a side elevation and a plan view of the cutting device and associated parts on a greatly-enlarged scale.

In said drawings 1 designates the frame of the machine, at the left hand or feed end of which is positioned a table 2 over which passes a feed web 3 movable thereover and passing about rollers 4 and 5, the latter of which may be a driving roller and form one of a pair of sheeting rollers 5, 6 between which the sheet of dough is rolled. The roller 6 is mounted in sliding bearings 7 and is under the action of screw and worm adjusting means 8 to vary the pressure on the dough and allow for treating sheets of different thickness. The dough passes from the sheeting rollers in a bight to a second web 9 which extends right through the machine and which travels in the direction of feed about rollers 10, 11, then about the cutting device 12 hereinafter described, then over frame or main table 13 of the machine to a knife edge 14 at the delivery end, and thence back over guide rollers 15, 15ª, 16 and jockey roller 17 to its commencement at roller 10.

The cutting device consists of a drum 18, best shown in Figs. 3 and 4, having disposed about its entire periphery rows of cutting edges 19 which may be suitably arranged in staggered formation as represented in Fig. 4, these cutting edges being upstanding and projecting from the periphery of the drum as annular cups.

It will be seen from Fig. 3 that the web 9 passes only about a part of the periphery of the drum 18, that is to say, where the cutting is to take place, this being effected by providing resistance means at the back of the web.

In the construction illustrated such resistance means comprises a curved cutting table or plate 20 adjustably mounted on screw spindles 21 carried in the frame 1 and under the action of worm nut and worm wheel gear 22 for the purpose of regulating the pressure and thus varying the resistance, according to requirements or the thickness of the dough under treatment. The said table may with advantage be so adjusted as to present a somewhat larger space between itself and the cutting device at its inlet or forward end than at its rear end, as clearly illustrated in Fig. 3, in order to ensure a gradual penetration of the dough by the cutters 19.

Close behind the table 20 there is shown in Fig. 3 a roller 23 formed of or covered with rubber or other highly resilient material and arranged below or behind the web 9. This roller is shown as mounted in sliding bearings 24 adjustable by means of screw and worm gear 25 in order to vary its pressure, and it is provided for the purpose of resiliently forcing the web 9, with the dough thereon, toward the drum so that the pieces cut by the cups will first be pressed into the same and afterward extracted therefrom by a quasi suction action which is produced by the entrance (or tendency toward entrance) of the web into the cups, in order that pieces which may adhere to the web may be carried away thereby properly separated from the scrap.

The scrap is removed, as usual in the type of machine in question, by an inclined web 26 located immediately behind the cutting device, and the separated pieces pass along on the web 9 to the knife edge 14 where they may be delivered on to pans or trays carried by a lower chain conveyor 27 to be passed into an oven for baking as customary.

Any convenient means for actuating the moving parts of the apparatus may be used, but those shown in the drawings comprise in the main, worm shafts 28, 29, 30 driving respectively through worm and worm wheel gear the feed web 3, the cutting device 12 and the scrap web 26, said shafts being driven through other worm gearing 31, 32, 33 from transverse shafts 34, 35, 36, respectively. The shaft 35 is driven at the speed at which the machine is required to work and the shaft 34 is driven from it by variable belt and pulley gear 37, 37ª, 37ᵇ as is also the shaft 36 by another chain 38 and variable pulley gear 38ª, 38ᵇ. The web 9 is driven by chain and sprocket gear 39, 39ª, 39ᵇ from another transverse shaft 40 which in turn is driven from shaft 35, and from which also the pan conveyor 27 is driven. The adjustments of the sheeting rollers and cutting table may be effected by hand wheels 42 and 43 respectively at the side of the machine acting through spindles 44 and 45 on the particular screw and worm gear.

In the claims which follow the term "dough" is intended for the sake of brevity to include other plastic substances.

What we claim as our invention and desire to secure by Letters Patent of the United States is:—

1. Apparatus for cutting dough comprising in combination a rotary cutting device provided on its periphery with spaced cutting members, a web adapted to feed a sheet of dough about part of the periphery of said cutting device, and a rigid arcuate resistance element for cooperation with the cutting device disposed behind the web and directly against the resistance of which the dough is cut by the cutting members, said resistance element being so disposed in relation to the cutting device as to cause the dough to gradually approach the cutting members, whereby gradual penetration and complete severance of the dough by said cutting members are effected.

2. Apparatus for cutting dough comprising in combination a rotary cutting device provided on its periphery with spaced cutting members, a web adapted to feed a sheet of dough about part of the periphery of said cutting device, a rigid arcuate resistance element for cooperation with the cutting device disposed behind the web and directly against the resistance of which the dough is cut by the cutting members, said resistance element being so disposed in relation to the cutting device as to cause the dough to gradually approach the cutting members, whereby gradual penetration and complete severance of the dough by said cutting members are effected, and means for adjusting said rigid resistance element relatively to the cutting device.

3. Dough-cutting apparatus, comprising a rotary drum provided upon its periphery with a multiplicity of radially-projecting hollow cutters arranged in spaced relation to one another, a pressure roller cooperating with said drum and having a highly-resilient peripheral surface, and a flexible web for feeding the dough to the drum to be cut, said web moving first past the cutters to permit the latter to act directly on the dough thereon and then between the drum and pressure roller; said roller serving initially to force the web and the cut pieces of dough into the interior of the hollow cutters, and immediately thereafter to extract said pieces from the cutters by a quasi suction action.

4. Dough-cutting apparatus, comprising a rotary drum provided upon its periphery with a multiplicity of radially-projecting cups arranged in spaced relation to one another and having cutting edges, a pressure roller cooperating with said drum and having a highly-resilient peripheral surface, and a flexible web for feeding the dough to the drum to be cut, said web moving first past the cups to permit them to act directly on the dough thereon and then between the drum and pressure roller; said roller serving initially to force the web and the cut pieces of dough into the cups, and immediately thereafter to extract said pieces from the cups by a quasi suction action.

5. Dough-cutting apparatus, comprising a rotary drum provided upon its periphery with a multiplicity of radially-projecting hollow cutters arranged in spaced relation to one another, a pressure roller cooperating with said drum and having a highly-resilient peripheral surface, a flexible dough-feeding web movable past the cutters to permit them to act directly on the dough thereon and then passing between the drum and pressure roller, and means for adjusting the pressure of the roller against the web; said roller serving initially to force the web and the cut pieces of dough into the interior of the hollow cutters, and immediately thereafter to extract said pieces from the cutters by a quasi suction action.

6. Dough-cutting apparatus, comprising a rotary drum provided upon its periphery with a multiplicity of radially-projecting hollow cutters arranged in spaced relation to one another, a pressure roller cooperating with said drum and having a highly-resilient peripheral surface, a rigid resistance element disposed in front of said roller and against which the cutters directly act, and a flexible web for feeding the dough to the drum to be cut, said web moving first between the resistance element and drum and then between said drum and the pressure roller; said roller serving initially to force the web and the cut pieces of dough into the interior of the hollow cutters, and immediately thereafter to extract said pieces from the cutters by a quasi suction action.

7. Dough-cutting apparatus, according to claim 6, in which the resistance element is so disposed in relation to the drum as to cause the dough to gradually approach the hollow cutters, thereby to effect gradual penetration and complete severance of the dough by said cutters.

In witness whereof we have signed this specification.

GEORGE RALPH BAKER.
WILLIAM EDWARD PRESCOTT.